US012122466B2

(12) United States Patent
Sauvageau et al.

(10) Patent No.: US 12,122,466 B2
(45) Date of Patent: Oct. 22, 2024

(54) DRIVE WHEEL FOR A TRACK SYSTEM, ENDLESS TRACK FOR A TRACK SYSTEM AND TRACK SYSTEM

(71) Applicant: SOUCY INTERNATIONAL INC., Drummondville (CA)

(72) Inventors: Yves Sauvageau, Drummondville (CA); Pierre-Yves Pepin, Drummondville (CA); Eric Halstead, Ste-Marie-Madeleine (CA); Charles Devin, Windsor (CA); Alexandre Gauthier, Drummondville (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 792 days.

(21) Appl. No.: 17/166,366

(22) Filed: Feb. 3, 2021

(65) Prior Publication Data

US 2021/0237813 A1  Aug. 5, 2021

Related U.S. Application Data

(60) Provisional application No. 62/969,212, filed on Feb. 3, 2020.

(51) Int. Cl.
*B62D 55/125* (2006.01)
*B62D 55/084* (2006.01)
*B62D 55/14* (2006.01)
*B62D 55/24* (2006.01)

(52) U.S. Cl.
CPC ......... *B62D 55/125* (2013.01); *B62D 55/084* (2013.01); *B62D 55/14* (2013.01); *B62D 55/244* (2013.01)

(58) Field of Classification Search
CPC .... B62D 55/084; B62D 55/14; B62D 55/125; B62D 55/244
USPC .......................................................... 305/129
See application file for complete search history.

(56) References Cited

U.S. PATENT DOCUMENTS

| 8,075,069 | B2 * | 12/2011 | Pech | ............... B62D 55/065 |
| | | | | 305/195 |
| 8,607,904 | B2 * | 12/2013 | Fukumoto | ......... B62D 55/02 |
| | | | | 180/9.26 |
| 2006/0267405 | A1 * | 11/2006 | Tucker | ............ B62D 55/0885 |
| | | | | 305/115 |

FOREIGN PATENT DOCUMENTS

| WO | WO-9309022 A1 * | 5/1993 | ............ B62D 55/12 |
| WO | WO-2018215895 A1 * | 11/2018 | ............ B62D 55/06 |

* cited by examiner

*Primary Examiner* — S. Joseph Morano
*Assistant Examiner* — Eva L Comino
(74) *Attorney, Agent, or Firm* — BCF LLP

(57) ABSTRACT

A drive wheel for a track system having an endless track that has first, second, and third drive wheel engagers is disclosed. The drive wheel has a hub, a body, a rim, a plurality of first, second and third track engagers radially disposed on the rim. Each of the plurality of second track engagers are operationally aligned with one of the plurality of first track engagers. The plurality of third track engagers are on at least one lateral side of the plurality of first track engagers. The plurality of first, second and third track engagers are configured to, respectively, driveably engage with a first, second, and third drive wheel engagers of the endless track. An endless track and a track system are also disclosed.

17 Claims, 10 Drawing Sheets

DRIVE WHEEL FOR A TRACK SYSTEM, ENDLESS TRACK FOR A TRACK SYSTEM AND TRACK SYSTEM

CROSS-REFERENCE TO RELATED APPLICATION

The present application claims priority to U.S. Provisional Patent Application No. 62/969,212, filed Feb. 3, 2020 entitled "Enhanced Driving Wheel for Endless Track", which is incorporated by reference herein in its entirety.

TECHNICAL FIELD

The present technology relates to drive wheels for track systems, endless track for track systems, and track systems.

BACKGROUND

Certain vehicles, such as, for example, agricultural vehicles (e.g., harvesters, combines, tractors, etc.), construction vehicles (e.g., bulldozers, front-end loaders, etc.) and recreational vehicles (e.g., all-terrain vehicles, utility-terrain vehicles, side-by-side vehicles, etc.) are used on ground surfaces that are soft, slippery and/or uneven (e.g., soil, mud, sand, ice, snow, etc.).

Conventionally, such vehicles have had large wheels with tires on them to move the vehicle along the ground surface. Under certain conditions, such tires may have poor traction on some kinds of ground surfaces and, as these vehicles are generally heavy, the tires may compact the ground surface in an undesirable way owing to the weight of the vehicle. As an example, when the vehicle is an agricultural vehicle, the tires may compact the soil in such a way as to undesirably inhibit the growth of crops. When the vehicle is a recreational vehicle, the tires may lack traction on certain terrain and in certain conditions.

In order to reduce the aforementioned drawbacks, to increase traction and to distribute the weight of the vehicle over a larger area on the ground surface, track systems were developed to be used in place of at least some of the wheels and tires on the vehicles. For example, under certain conditions, track systems enable agricultural vehicles to be used in wet field conditions as opposed to its wheeled counterpart. In other conditions, track systems enable recreational vehicles to be used in low traction terrains such as snowy roads.

Conventional track systems do, however, present some inconveniences. Conventional track systems generally have a drive wheel connected to a drive shaft of a vehicle, where the drive wheel engages an endless track to drive the track system. At high torques, tooth skipping can occur, which along with high stresses applied by the drive wheel to the endless track can reduce the life of a track system.

Therefore, there is a desire for a track system that could mitigate the above-mentioned issues.

SUMMARY

It is therefore an object of the present technology to ameliorate the situation with respect to at least one of the inconveniences present in the prior art.

It is also an object of the present technology to provide an improved drive wheel, an improved endless track and an improved track system at least in some instances as compared with some of the prior art.

In various aspects, the present technology relates to drive wheels for track systems, endless tracks for track systems and track systems. The drive wheel and the endless track are driveably engageable. The drive wheel has a plurality of engagers that engage with a plurality of engagers of the endless track such that force transfer between the drive wheel and the endless track is enhanced, and stress within the drive wheel and the endless track is reduced.

In the context of the following description, "outwardly" or "outward" means away from a longitudinal center plane of the track system, and "inwardly" or "inward" means toward the longitudinal center plane. In addition, in the context of the following description, "longitudinally" means in a direction parallel to the longitudinal center plane of the track system in a plane parallel to flat level ground, "laterally" means in a direction perpendicular to the longitudinal center plane in a plane parallel to flat level ground, and "generally vertically" means in a direction contained in the longitudinal center plane along a height direction of the track system generally perpendicular to flat level ground. Also, the term "wheel assemblies" include all the necessary structure (bearing structures, pins, axles and other components) to permit a structure/wheel to pivot/rotate about an axis, as the case may be. In the following description and accompanying Figures, the track system is configured to be attached to a right side of the chassis of the vehicle.

According to an aspect of the present technology, there is provided a drive wheel for a track system. The track system has an endless track with an inner surface, the inner surface having a plurality of first drive wheel engagers, a plurality of second drive wheel engagers, and a plurality of third drive wheel engagers. The drive wheel is engageable with the endless track. The drive wheel includes a hub operatively connectable to a driving axle of a vehicle, a body extending radially from the hub, and a rim radially surrounding to the body. The rim has an outer rim surface engeable to the inner track surface. The drive wheel also includes a plurality of first track engagers, a plurality of second track engagers and a plurality of third track engagers. The plurality of first track engagers is radially disposed on the rim and configured for being driveably engageable with the plurality of first drive wheel engagers of the endless track. The plurality of second track engagers radially is disposed on the rim, and each one of the plurality of second track engagers is operationally aligned with one of the plurality of first track engagers. The plurality of second track engagers is configured for being driveably engageable with the plurality of second drive wheel engagers of the endless track. The plurality of third track engagers is radially disposed on the rim, on at least one lateral side of the plurality of first track engagers. The plurality of third track engagers is configured for being driveably engageable with the plurality of third drive wheel engagers of the endless track.

In some embodiments, the rim has a center portion, and the plurality of first and second track engagers are radially disposed at the center portion.

In some embodiments, the rim has a first lateral portion and a second lateral portion disposed on either side of the center portion, and the plurality of third track engagers are disposed at the first and second lateral portions.

In some embodiments, the rim includes at least one crowned portion extending axially outwardly from the rim, and a plurality of fourth track engagers disposed on the at least one crowned portion. The plurality of fourth track engagers is engageable with a plurality of fourth drive wheel engagers of the endless track.

In some embodiments, the drive wheel further has a friction-enhancing finish on the outer rim surface configured for being driveably engageable with the inner surface of the endless track.

In some embodiments, the friction-enhancing finish is a knurled finish.

In some embodiments, the plurality of first track engagers extend radially inwardly from the outer rim surface, and the plurality of third track engagers extends from the outer rime surface, in one of a radially outwards direction; and a radially inward direction.

In some embodiments, the each one of the plurality of second track engagers is operationally aligned with the one of the plurality of first track engagers by being defined in the one of the plurality of the first track engagers, and the each one of the plurality of second track engagers extends radially inwardly.

In some embodiments, the each one of the plurality of second track engagers is operationally aligned with the one of the plurality of first track engagers by being disposed on the one of the plurality of the first track engagers, and the each one of the plurality of second track engagers extends radially outwardly.

In some embodiments, the operational alignment of the plurality of second track engagers with the plurality of first track engagers enhances a grip between the drive wheel and the endless track.

In some embodiments, the operational alignment of the plurality of second track engagers with the plurality of first track engagers reduces stress induced in the endless track.

In another aspect of the present technology, there is provided an endless track for a track system. The track system has a drive wheel with a plurality of first track engagers, a plurality of second track engagers and a plurality of third track engagers. The endless track is engageable with the drive wheel of the track system. The endless track has an inner surface, a plurality of first drive wheel engagers, a plurality of second drive wheel engagers, a plurality of third wheel engagers and an outer surface opposite to the inner surface. The plurality of first drive wheel engagers is disposed longitudinally on the inner surface, and is engageable with the plurality of first track engagers of the drive wheel. The plurality of second drive wheel engagers is disposed longitudinally on the inner surface, each one of the plurality of second drive wheel engagers being operationally aligned with at least one of the plurality first drive wheel engagers. The plurality of second drive wheel engagers is engageable with the plurality of second track engagers of the drive wheel. The plurality of third drive wheel engagers is disposed longitudinally on the inner surface, on at least one lateral side of the plurality of first drive wheel engagers. The plurality of third drive wheel engagers is engageable with the plurality of third track engagers of the drive wheel.

In some embodiments, the inner surface has a center portion, and the plurality of first and second drive wheel engagers are disposed on the center portion.

In some embodiments, the inner surface has a first lateral portion and a second lateral portion disposed on either side of the center portion, and the plurality of third drive wheel engagers are disposed at the first and second lateral portions.

In some embodiments, the endless track includes a first lateral edge, a second lateral edge, and a plurality of fourth drive wheel engagers disposed on at least one of the first and second lateral edges. The plurality of fourth drive wheel engagers is engageable with a plurality of fourth drive wheel engagers of the drive wheel.

In some embodiments, the plurality of third drive wheel engagers extends from the inner surface toward the outer surface.

In some embodiments, the plurality of third drive wheel engagers; extends from the inner surface, opposite to the outer surface.

In some embodiments, each one of the plurality of second drive wheel engagers is operationally aligned with the at least one of the plurality of first drive wheel engagers by being defined in the inner surface of the endless track, adjacent to the at least one of the plurality of first drive wheel engagers, and extending from the inner surface toward the outer surface.

In some embodiments, each one of the plurality of second drive wheel engagers is operationally aligned with the at least one of the plurality of first drive wheel engagers by being defined in the inner surface of the endless track, adjacent to the at least one of the plurality of first drive wheel engagers, and extending from the inner surface opposite to the outer surface.

In some embodiments, the operational alignment of the plurality of second drive wheel engagers with the plurality of first drive wheel engagers enhances a grip between the drive wheel and the endless track.

In some embodiments, the operational alignment of the plurality of second drive wheel engagers with the plurality of first drive wheel engagers reduces stress induced in the endless track.

According to another aspect of the present technology, there is provided a track system for a vehicle. The track system includes a frame assembly, a drive wheel, at least one support wheel, at least one idler wheel and an endless track. The drive wheel, the at least one support wheel assembly and the at least one idler wheel assembly are connected to the frame assembly. The drive wheel has a hub operatively connectable to a driving axle of a vehicle, a body extending radially from the hub and a rim connected to the body. The rim has an outer rim surface engeable to the inner track surface. The drive wheel also has a plurality of first track engagers, a plurality of second track engagers and a plurality of third track engagers. The plurality of first track engagers is radially disposed on the rim. The plurality of second track engagers is radially disposed on the rim, and each one of the plurality of second track engagers is operationally aligned with one of the plurality of first track engagers. The plurality of third track engagers is radially disposed on the rim, on at least one lateral side of the plurality of first track engagers. The endless track surrounds the drive wheel, the at least one support wheel assembly and the at least one idler wheel assembly. The endless track has an inner surface and an outer surface opposite to the inner surface. The inner surface has a plurality of first drive wheel engagers, a plurality of second drive wheel engagers and a plurality of third drive wheel engagers. The plurality of first drive wheel engagers is disposed longitudinally. The plurality of second drive wheel engagers is disposed longitudinally, each one of the plurality of second drive wheel engagers being operationally aligned with at least one of the plurality first drive wheel engagers. The plurality of third drive wheel engagers is disposed longitudinally on at least one lateral side of the plurality of first drive wheel engagers. The plurality of first track engagers engages the plurality of first drive wheel engagers, the plurality of second track engagers engages the plurality of second drive wheel engagers and the plurality of third track engagers engages the plurality of the third drive wheel engagers.

Embodiments of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Introduction

Figure 1:
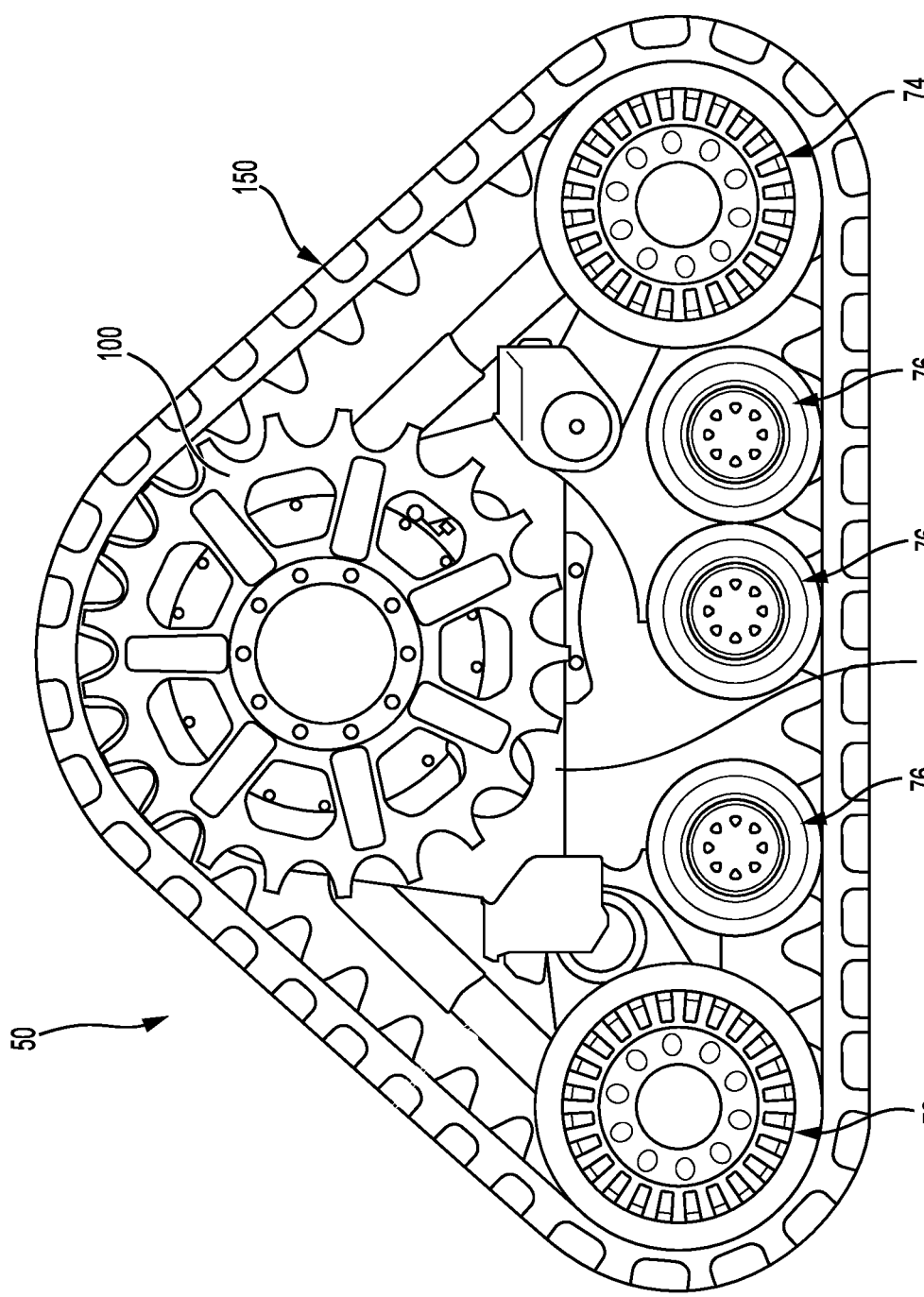
FIG. 1 is a right side elevation view of a track system.

With reference to FIG. 1, a track system 50, which has a drive wheel 100 according to a first embodiment of the present technology and an endless track 150 according to the first embodiment of the present technology, is illustrated. It is to be expressly understood that the track system 50, the drive wheel 100 and the endless track 150 are merely embodiments of the present technology. Thus, the description thereof that follows is intended to be only a description of illustrative examples of the present technology. This description is not intended to define the scope or set forth the bounds of the present technology. In some cases, what are believed to be helpful examples of modifications or alternatives to the track system 50, the drive wheel 100 and the endless track 150 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing or embodying that element of the present technology. As a person skilled in the art would understand, this is likely not the case. In addition, it is to be understood that the track system 50, the drive wheel 100 and the endless track 150 may provide in certain aspects simple embodiments of the present technology, and that where such is the case it has been presented in this manner as an aid to understanding. As persons skilled in the art would understand, various embodiments of the present technology may be of a greater complexity than what is described herein.

Figure 2:
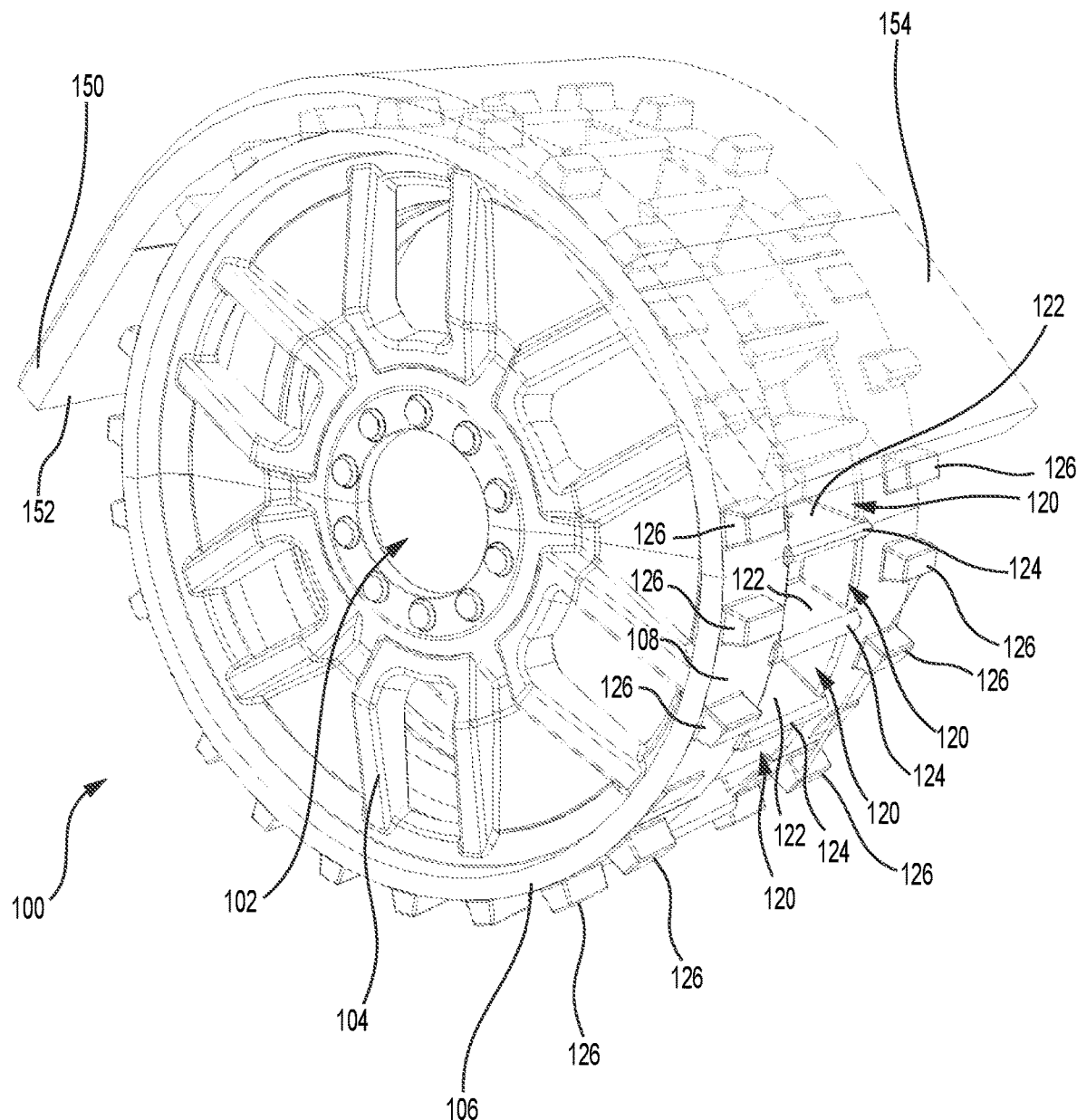
FIG. 2 is a perspective view taken from a top, front, right side of a first embodiment of a drive wheel and portion of an endless track of the track system of FIG. 1.
Figure 4:
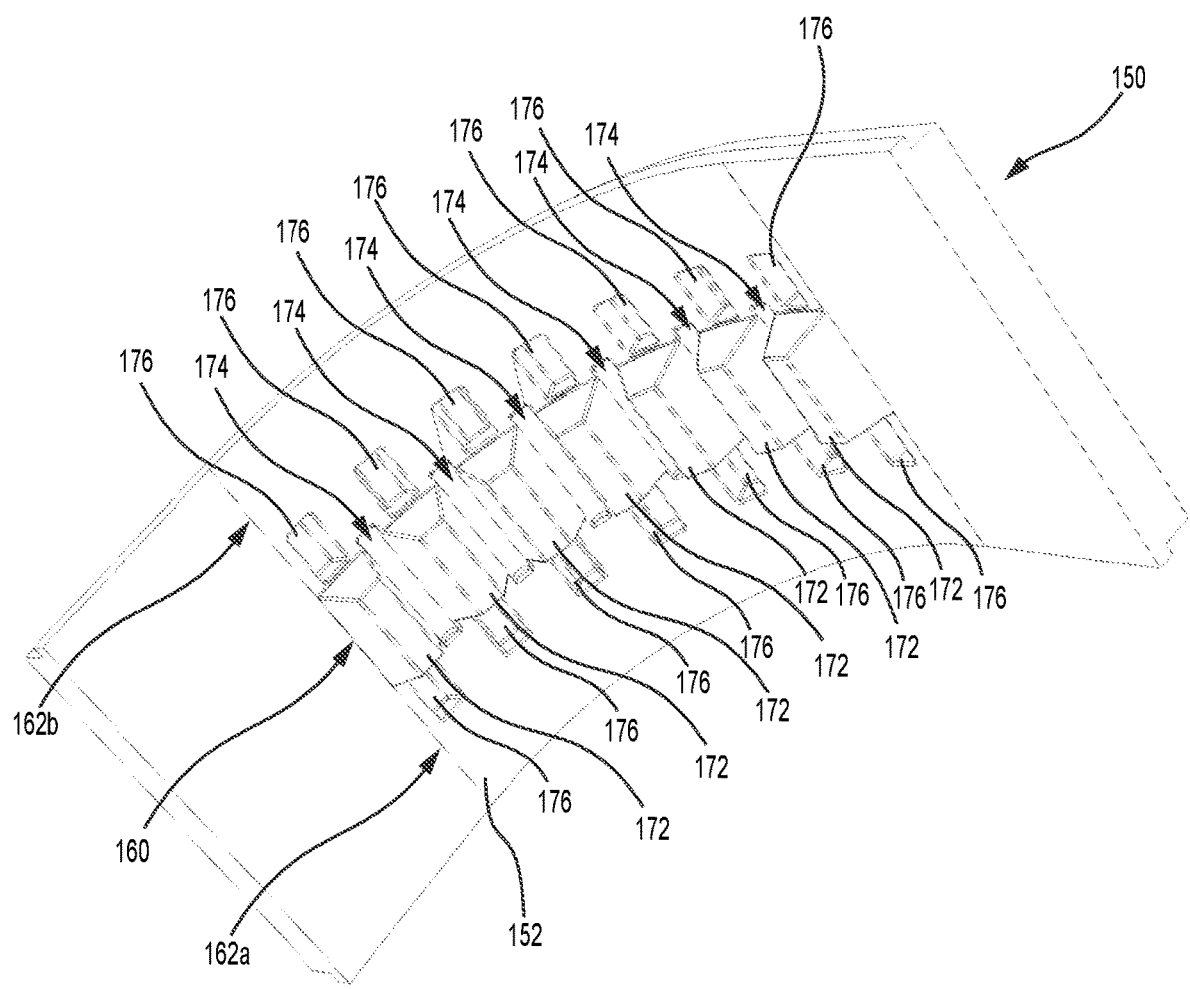
FIG. 4 is a perspective view taken from a bottom, rear, right side of the portion of the endless track of FIG. 2.

Generally describing the first embodiment and referring to FIG. 2, the track system 50 has the drive wheel 100, which has a plurality first track engagers 122, a plurality of second track engagers 124 and a plurality of third track engagers 126, as well as the endless track 150, which has a plurality of first drive wheel engagers 172 (as best seen in FIG. 4), a plurality of second drive wheel engagers 174 (as best seen in FIG. 4) as well as a plurality of third drive wheel engagers 176 (as best seen in FIG. 4).

The first track engagers 122 are driveably engageable with the first drive wheel engagers 172, the second track engagers 124 are driveably engageable with the second drive wheel engagers 174, and the third track engagers 126 are driveably engageable with the third drive wheel engagers 176.

As will become apparent from the description below, the engagements mentioned above may improve force transfer from the drive wheel 100 to the endless track 150, at least in some conditions.

Vehicle

The track system 50 is operatively connectable to a driving axle of a vehicle. It is understood that the track system 50 including the present technology is configured to be operatively connectable to various agricultural, industrial, military and/or recreational vehicles.

Track System

Referring to FIG. 1, the track system 50 has the drive wheel 100 which is operatively connected to the driving axle (not shown). The drive wheel 100, which will be described in greater detail below, is configured to engage with the endless track 150.

The track system 50 includes a frame assembly 60 that is disposed laterally inwardly of the drive wheel 100. It is contemplated that in other embodiments, the drive wheel 100 could be disposed outwardly of the frame assembly 60.

The track system 50 also includes a forward idler wheel assembly 72, a rearward idler wheel assembly 74 as well as three support wheel assemblies 76 that are all connected to the frame assembly 60. It is contemplated that in some embodiments, there could be more than one forward idler wheel assembly 72. In other embodiments, there could be more than one rearward idler wheel assembly 74. In yet other embodiments, there could be more or less than three support wheel assemblies 76. The three support wheel assemblies 76 are disposed between the forward and rearward idler wheel assemblies 72, 74. It is contemplated that in other embodiments, the support wheel assemblies 76 could be disposed elsewhere along the track system 50. The forward and rearward idler wheel assemblies 72, 74 are connected to tensioners (not shown) that are operable to adjust the tension in the endless track 150 by selectively moving the forward and rearward idler wheel assemblies 72, 74 away or toward the frame assembly 60. In some embodiments, only one of the forward and rearward idler wheel assemblies 72, 74 could be connected to a tensioner.

Still referring to FIG. 1, the endless track 150, which is configured to engage with the drive wheel 100, surrounds the drive wheel 100, the forward and rearward idler wheel assemblies 72, 74 as well as the support wheel assemblies 76. In the present embodiment, the endless track 150 is an endless polymeric track. It is contemplated that in some embodiments, the endless track 150 could be constructed of a wide variety of materials and structures including metallic components known in track systems 50. The endless track 150 will be described in greater detail below.

First Embodiment

Figure 3:
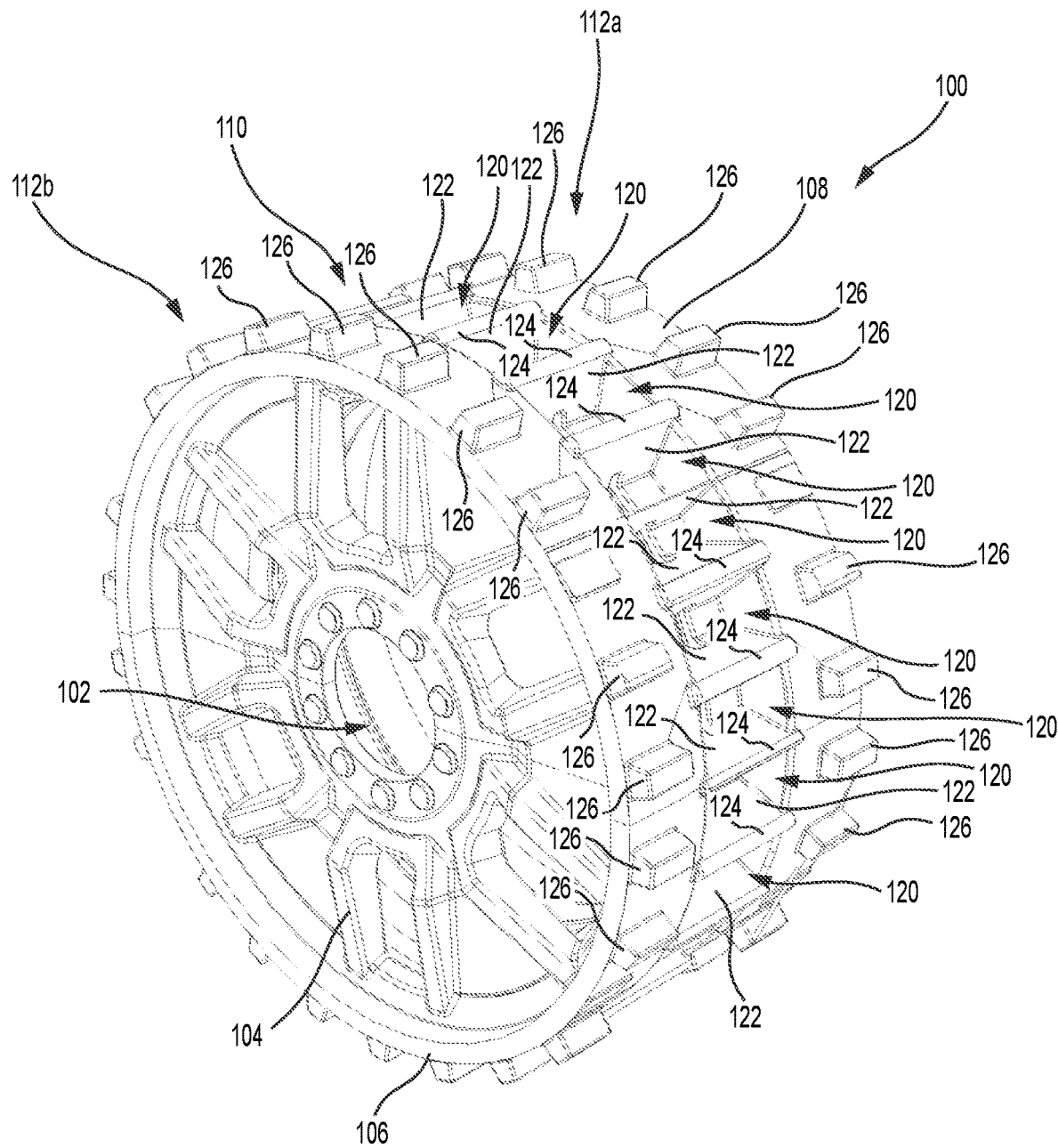
FIG. 3 is a perspective view taken from a top, front, right side of the drive wheel of FIG. 2.

Referring to FIGS. 2 to 4, a first embodiment of the drive wheel 100 and the endless track 150 will now be described. As mentioned above, the drive wheel 100 and the endless track 150 are configured to engage with one another.

The drive wheel 100 has a hub 102, a body 104 and a rim 106. The hub 102 is at a center of the drive wheel 100 and is operatively connectable to the driving axle. The body 104 extends radially from the hub 102. The rim 106 radially surrounds the body 104, and has an outer rim surface 108 that engages an inner surface 152 of the endless track 150. As best seen in FIG. 3, the rim 106 has a center portion 110, a left lateral portion 112a and a right lateral portion 112b. It is contemplated that in some embodiments, the center portion 110 could be omitted such that there could only be left and right lateral portions 112a, 112b.

The drive wheel 100 has a plurality of recesses 120 radially defined at the center portion 110 of the rim 106. The plurality of recesses 120 is separated by the plurality of first track engagers 122. Thus, in this embodiment, the first track engagers 122 are radially disposed at the center portion 110 of the rim 106, and extend radially inwardly from the outer rim surface 108. It is contemplated that in some embodiments, for instance in embodiments where the center portion 110 is omitted, the recesses 120 and the first track engagers 122 could be offset from the center portion 110. It is also contemplated that in some embodiments, the first track engagers 122 could extend radially outwardly from the outer rim surface 108.

The drive wheel 100 also has the plurality of second track engagers 124 also radially disposed on the rim 106, at the center portion 110 thereof. Each one of the second track engagers 124 is operationally aligned with one of the first track engagers 122, such that each one of the plurality of the second track engagers 124 is disposed on one of the first track engagers 122, and extends radially outwardly therefrom. In other words, the second track engagers 124 extend radially outwardly from the outer rim surface 108.

As seen in FIG. 2, the drive wheel 100 further has the plurality of third track engagers 126 radially disposed on the rim 106. In this instance, the third track engagers 126 are disposed at both the left lateral portion 112a and at the right lateral portion 112b. Thus, the third track engagers 126 are disposed on left and right lateral sides of the first track engagers 122. It is contemplated that in some embodiments, the third track engagers 126 could only be disposed on one of the left and the right lateral sides 112a, 112b of the first track engagers 122. The third track engagers 126 extend radially outwardly from the outer rim surface 108.

Referring now to FIG. 4, the endless track 150, which is configured to engage the drive wheel 100, has the inner surface 152 and an outer surface 154 opposite to the inner surface 152. The inner surface 152 has a center portion 160, a left lateral portion 162a and a right lateral portion 162b. It is contemplated that in some embodiments, the center portion 160 could be omitted such that there could only be left and right lateral portions 162a, 162b.

The endless track 150 has the plurality of first drive wheel engagers 172 disposed longitudinally along the center portion 160 of the inner surface 152. It is contemplated that in some embodiments, the first drive wheel engagers 172 could be offset from the center portion 160. In the present embodiment, the first drive wheel engagers 172 extend from the inner surface 152 opposite to the outer surface 154. As will be described in greater detail below, the first drive wheel engagers 172 are configured to be received in the recesses 120.

The endless track 150 also has the plurality of second drive wheel engagers 174 defined longitudinally along the center portion 160 of the inner surface 152. Each of the second drive wheel engagers 174 is operationally aligned with two of the first drive wheel engagers 172, such that each of the second drive wheel engagers 174 is longitudinally adjacent to two of the first drive wheel engagers 172. It is contemplated that in some embodiments, the second drive wheel engagers 174 could only be operationally aligned with one first drive wheel engagers 172. In the present embodiment, the second drive wheel engagers 174 extend from the inner surface 152 toward the outer surface 154, such that the second drive wheel engagers 174 are recesses 174. As will be described in greater detail below, the second drive wheel engagers 174 are configured to receive the second track engagers 124 therein.

The endless track 150 further has the plurality of third drive wheel engagers 176 disposed longitudinally along the inner surface 152. In some instances, the third drive wheel engagers 176 are disposed on both the left lateral portion 162a and the right lateral portion 162b. Thus, the third drive wheel engagers 176 are disposed on left and right lateral sides of the first drive wheel engagers 172. It is contemplated that in some embodiments, the third drive wheel engagers 176 could only be disposed on one lateral side of the first drive wheel engagers 172.

In the present embodiment, the third drive wheel engagers 176 extend from the inner surface 152 toward the outer surface 154 such that the third drive wheel engagers 176 are recesses 176. As will be described in greater detail below, the third drive wheel engagers 176 are configured to receive the third track engagers 126 therein.

Figure 5:
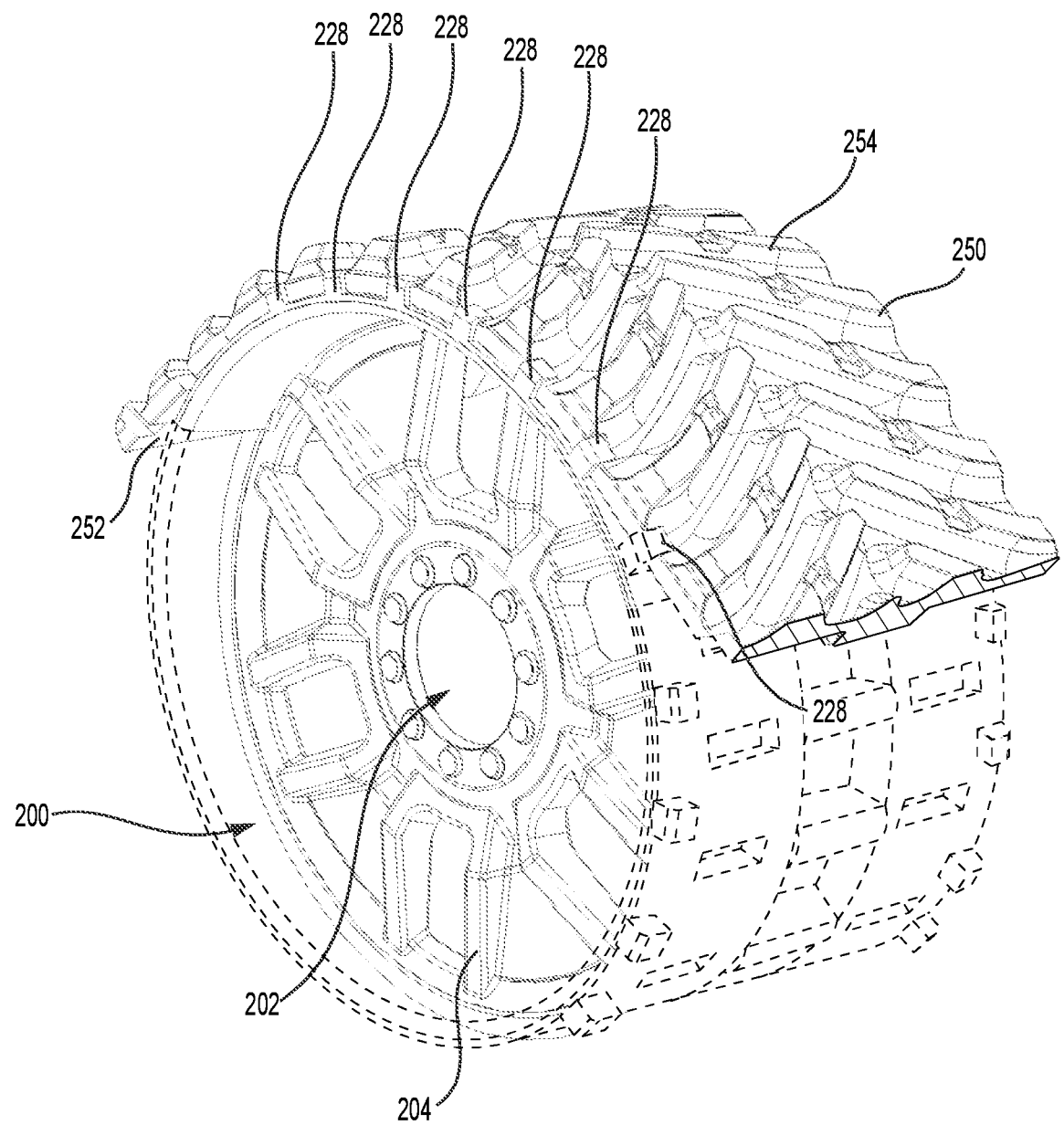
FIG. 5 is a perspective view taken from a top, front, right side of a second embodiment of a portion of a drive wheel and a portion of an endless track of the track system of FIG. 1.

The outer surface 154 has a tread defined thereon (shown in alternate embodiment at FIG. 5). It is contemplated that the tread could vary from one embodiment to another. In some embodiments, the tread could depend on the type of vehicle on which the track system 50 is to be used and/or the type of ground surface on which the vehicle is destined to travel.

The engagement between the drive wheel 100 and the endless track 150 resulting in force transfer will now be described in accordance to the present embodiment.

At any given time, a portion of the drive wheel 100 is engaging a portion of the endless track 150, as shown in FIG. 2. In some instances, some of the first drive wheel engagers 172 of the endless track 150 are received in some of the recesses 120 of the drive wheel 100 such that some of the first track engagers 122 of the drive wheel 100 engage with some of the first drive wheel engagers 172, some of the second track engagers 124 of the drive wheel 100 are received in, and engage with, the second drive wheel engagers 174 of the endless track 100, and some of the third track engagers 126 of the drive wheel 100 are received in, and engage with, the third drive wheel engagers 176.

When the drive wheel 100 is rotated by the driving axle of the vehicle, the rotational force (torque) thereof is transmitted to the endless track 150. The engagement between the first track engagers 122 and the first drive wheel engagers 172 is typically how most of the rotational force of the drive wheel 100 is transferred to the endless track 150. As such, the first drive wheel engagers 172 are subject to significant stresses. The engagement between the second track engagers 124 and the second drive wheel engagers 174 assists in transferring a portion of the rotational force of the drive wheel 100 to the endless track 150, thereby reducing the magnitude of the stresses subjected to the first drive wheel engagers 172. In addition, the engagement between the second track engagers 124 and the second drive wheel engagers 174 enhances a grip between the drive wheel 100 and the endless track 150, which reduces the likelihood for tooth skipping. The shape of the second drive wheel engagers 174 further aids in reducing stresses present within the endless track 150, by reducing stress concentrations caused by sharp corners and/or smaller radii that would otherwise be present between the first drive wheel engagers 172. The engagement between the third track engagers 126 and the third drive wheel engagers 176 also contributes to the transfer of a portion of the rotational force of drive wheel 100 to the endless track 150, thereby further reducing the magnitude of the stresses subjected to the first drive wheel engagers 172.

The combination of the first track engagers 122, the second track engagers 124 and the third track engagers 126 in the drive wheel 100, and the combination of the first drive wheel engagers 172, the second track engagers 174 and the third track engagers 176 in the endless track 150, in addition to reducing stresses within the drive wheel 100 and the endless track 150 and enhancing the grip between the drive wheel 100 and the endless track 150, also aid in reducing accumulation of matter within the drive wheel 100 and the endless track 150. For instance, the presence of the second drive wheel engagers 174 can prevent the accumulation of matter between the first engagers 172. The combination of the first track engagers 122, the second track engagers 124 and the third track engagers 126 in the drive wheel 100, and the combination of the first drive wheel engagers 172, the second track engagers 174 and the third track engagers 176 in the endless track 150 can also permit for a lighter endless track 150, and thus can also provide an economical advantage.

Second Embodiment

Figure 6:
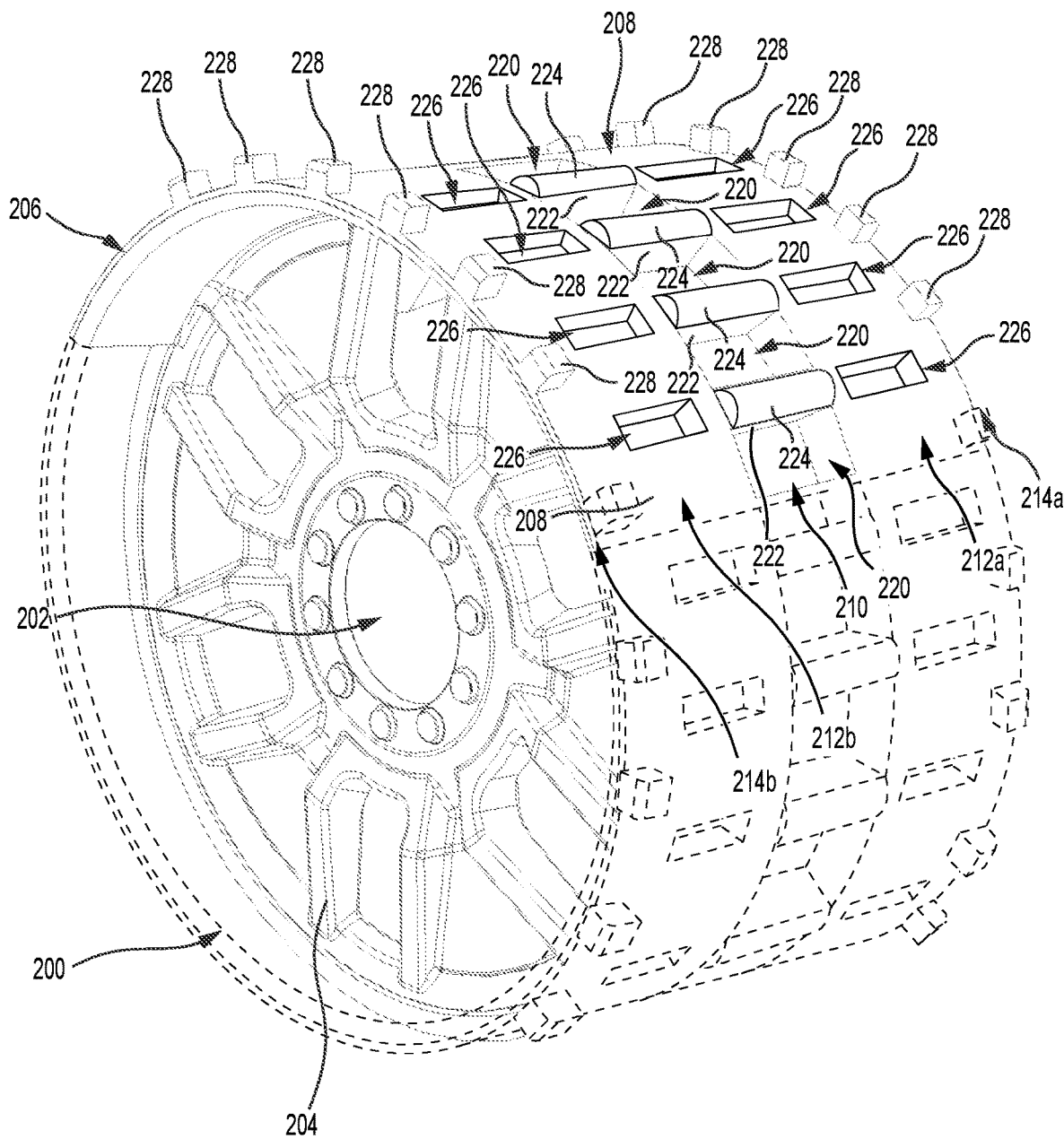
FIG. 6 is a perspective view taken from a top, front, right side of the portion of the drive wheel of FIG. 5.
Figure 7:
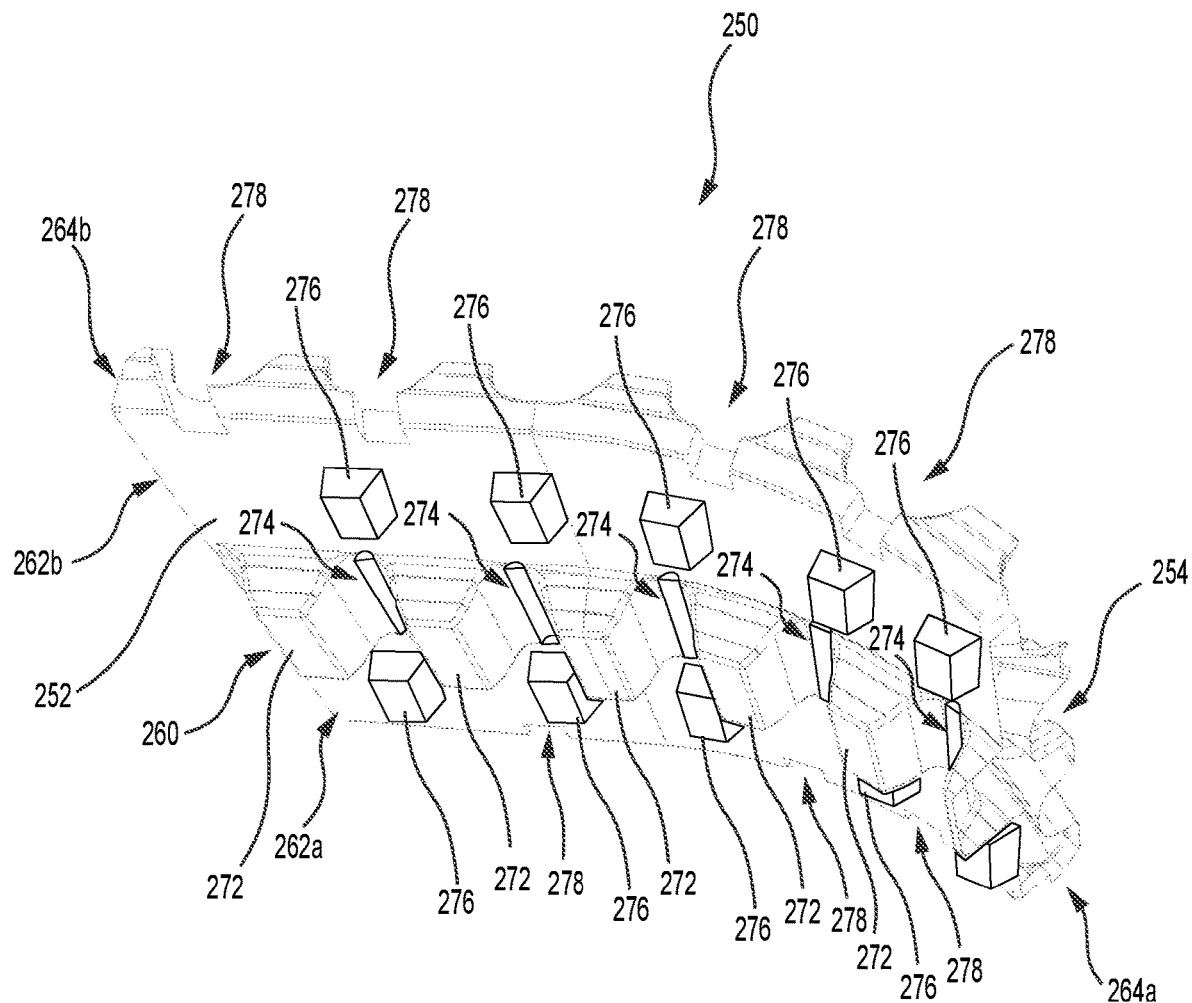
FIG. 7 is a perspective view taken from a bottom, front, right side of the portion of the endless track of FIG. 5.

Referring now to FIGS. 5 to 7, a portion of a second embodiment of the drive wheel 100, namely referenced as drive wheel 200, and the endless track 150, namely referenced as endless track 250, is shown. It is understood that though only a portion is shown, the features described below are present, where applicable, on the entire drive wheel 200 and/or on the entire endless track 250. As mentioned above, the drive wheel 200 and the endless track 250 are configured to engage with one another.

The drive wheel 200 has a hub 202, a body 204 and a rim 206. The hub 202 is at a center of the drive wheel 200 and is operatively connectable to the driving axle. The body 204 extends radially from the hub 102. The rim 206 radially surrounds the body 204, and has an outer rim surface 208 that engages an inner surface 252 of the endless track 250. The rim 206 has a center portion 210, a left lateral portion 212a and a right lateral portion 212b. It is contemplated that in some embodiments, the center portion 110 could be omitted such that there could only be left and right lateral portions 212a, 212b. In the present embodiment, the rim 206 also has a left crowned portion 214a that extends axially outwardly, to the left, from the left lateral portion 212a of the rim 206, and a right crowned portion 214b that extends axially outwardly, to the right, from the right lateral portion 212b of the rim 206.

The drive wheel 200 has a plurality of recesses 220 radially defined at the center portion 210 of the rim 206, and extend radially inwardly from the outer rim surface 208. The plurality of recesses 220 is separated by a plurality of first track engagers 222. Thus, in this embodiment, the first track engagers 222 are radially disposed at the center portion 210 of the rim 206, and extend radially inwardly from the outer rim surface 208. It is contemplated that in some embodiments, for instance in embodiments where the center portion 210 is omitted, the recesses 220 and the first track engagers 222 could be offset from the center portion 210. It is also contemplated that in some embodiments, the first track engagers 222 could extend radially outwardly from the outer rim surface 208.

The drive wheel 200 also has a plurality of second track engagers 224 also radially disposed on the rim 206, at the center portion 210 thereof. Each one of the second track engagers 224 is operationally aligned with one of the first track engagers 222, such that each one of the plurality of the second track engagers 224 is disposed on one of the first track engagers 222, and extends radially outwardly therefrom. In other words, the second track engagers 224 extend radially outwardly from the outer rim surface 208.

The drive wheel 200 further has a plurality of third track engagers 226 radially disposed on the rim 206. In this instance, the third track engagers 226 are disposed at both the left lateral portion 212a and at the right lateral portion 212b. Thus, the third track engagers 226 are disposed on left and right lateral sides of the first track engagers 222. It is contemplated that in some embodiments, the third track engagers 226 could only be disposed on one lateral side of the first track engagers 222. The third track engagers 226 extend radially inwardly from the outer rim surface 208, such that the third track engagers 226 are recesses 226.

The drive wheel 200 also has a plurality of edge track engagers 228 disposed on the rim 206. More precisely, the edge track engagers 228 are disposed at both the left crowned portion 214a and the right crowned portion 214b. It is contemplated that in some embodiments, the edge track engagers 228 could only be disposed on one of the left and right crowned portions 214a, 214b of the drive wheel 200. The edge track engagers 228 extend radially outwardly from the outer rim surface 208.

Referring now to FIG. 7, the endless track 250, which is configured to engage the drive wheel 200, has the inner surface 252 and an outer surface 254 opposite to the inner surface 252. The inner surface 252 has a center portion 260, a left lateral portion 262a and a right lateral portion 262b. It is contemplated that in some embodiments, the center portion 260 could be omitted such that there could only be left and right lateral portions 262a, 262b. The endless track 250 also has a left lateral edge 264a on an outer edge of the left lateral portion 262a, and a right lateral edge 264b on an outer edge of the right lateral portion 262b.

The endless track 250 has a plurality of first drive wheel engagers 272 disposed longitudinally along the center portion 260 of the inner surface 252. It is contemplated that in some embodiments, the first drive wheel engagers 272 could be offset from the center portion 260. In the present embodiment, the first drive wheel engagers 272 extend from the inner surface 252 opposite to the outer surface 254. As will be described in greater detail below, the first drive wheel engagers 272 are configured to be received in the recesses 220.

The endless track 250 also has a plurality of second drive wheel engagers 274 defined longitudinally along the center portion 260 of the inner surface 252. Each of the second drive wheel engagers 274 is operationally aligned with two of the first drive wheel engagers 272, such that each of the second drive wheel engagers 274 is longitudinally adjacent to two of the first drive wheel engagers 272. In the present embodiment, the second drive wheel engagers 274 extend from the inner surface 252 toward the outer surface 254, such that the second drive wheel engagers 274 are recesses. As will be described in greater detail below, the second drive wheel engagers 274 are configured to receive the second track engagers 224 therein.

The endless track 250 further has a plurality of third drive wheel engagers 276 that is disposed longitudinally along the inner surface 252. In this instance, the third drive wheel engagers 276 are disposed on both the left lateral portion 262a, and the right lateral portion 262b. Thus, the third drive wheel engagers 276 are disposed on left and right lateral sides of the first drive wheel engagers 272. It is contemplated that in some embodiments, the third drive wheel engagers 276 could only be disposed on one lateral side of the first drive wheel engagers 272. The third drive wheel engagers 276 extend from the inner surface 252 opposite to the outer surface 254, and are configured to be received in the third track engagers 226.

The endless track 250 also has a plurality of edge drive wheel engagers 278. More precisely, the edge drive wheel engagers 278 are on the left and right lateral edges 274a, 274b of the endless track 250. In the present embodiment, the edge drive wheel engagers 278 are apertures 278 that extend from the inner surface 252 to the outer surface 254, and are configured to receive the edge track engagers 178 therein.

The outer surface 254 has a tread defined thereon (best seen in FIG. 5). It is contemplated that the tread could vary from one embodiment to another. In some embodiments, the tread could depend on the type of vehicle on which the track system 50 is to be used and/or the type of ground surface on which the vehicle is destined to travel.

The engagement between the drive wheel 200 and the endless track 250 resulting in force transfer will now be described in accordance to the present embodiment.

At any given time, a portion of the drive wheel 200 is engaging a portion of the endless track 250, as shown in FIG. 5. In some instances, some of the first drive wheel engagers 272 of the endless track 250 are received in some of the recesses 220 of the drive wheel 200 such that some of the first track engagers 222 of the drive wheel 200 engage with some of the first drive wheel engagers 272: some of the second track engagers 224 of the drive wheel 200 are received in, and engage with, the second drive wheel engagers 274 of the endless track 200; some of the third track engagers 226 of the drive wheel 200 receive therein, and engage with, the third drive wheel engagers 276; and some of the edge track engagers 228 of the drive wheel 200 are received in, and engage with, the edge drive wheel engagers 278.

When the drive wheel 200 is rotated by the driving axle of the vehicle, the rotational force (torque) thereof is transmitted to the endless track 250. The engagement between the first track engagers 222 and the first drive wheel engagers 272 is typically how most of the rotational force of the drive wheel 200 is transferred to the endless track 250. As such, the first drive wheel engagers 272 are subject to significant stresses. The engagement between the second track engagers 224 and the second drive wheel engagers 274 assists in transferring a portion of the rotational force of the drive wheel 200 to the endless track 250, thereby reducing the magnitude of the stresses subjected to the first drive wheel engagers 272. In addition, the engagement between the second track engagers 224 and the second drive wheel engagers 274 enhances a grip between the drive wheel 200 and the endless track 250, which reduces the likelihood for tooth skipping. The shape of the second drive wheel engagers 274 further aids in reducing stresses present within the endless track 250, by reducing stress concentrations caused by sharp corners and/or smaller radii that would otherwise be present between the first drive wheel engagers 272. The engagement between the third track engagers 226 and the third drive wheel engagers 276 also help in transferring a portion of the rotational force of drive wheel 200 to the endless track 250, thereby further reducing the magnitude of the stresses subjected to the first drive wheel engagers 272. Additionally, the engagement between the edge track engagers 228 and the edge drive wheel engagers 278 also contributes to the transfer of some of the rotational force of the drive wheel 200 to the endless track 250, thereby further reducing the magnitude of the stresses subjected to the first drive wheel engagers 272.

The combination of the first track engagers 222, the second track engagers 224 and the third track engagers 226 in the drive wheel 200, and the combination of the first drive wheel engagers 272, the second track engagers 274 and the third track engagers 276 in the endless track 250, in addition to reducing stresses within the drive wheel 200 and the endless track 250 and enhancing the grip between the drive wheel 200 and the endless track 250, also aid in reducing accumulation of matter within the drive wheel 200 and the endless track 250. For instance, the presence of the second drive wheel engagers 274 can prevent the accumulation of matter between the first engagers 272. The combination of the first track engagers 222, the second track engagers 224 and the third track engagers 226 in the drive wheel 200, and the combination of the first drive wheel engagers 272, the second track engagers 274 and the third track engagers 276 in the endless track 250 can also permit for a lighter endless track 250, and thus can also provide an economical advantage.

Third Embodiment

Figure 8:
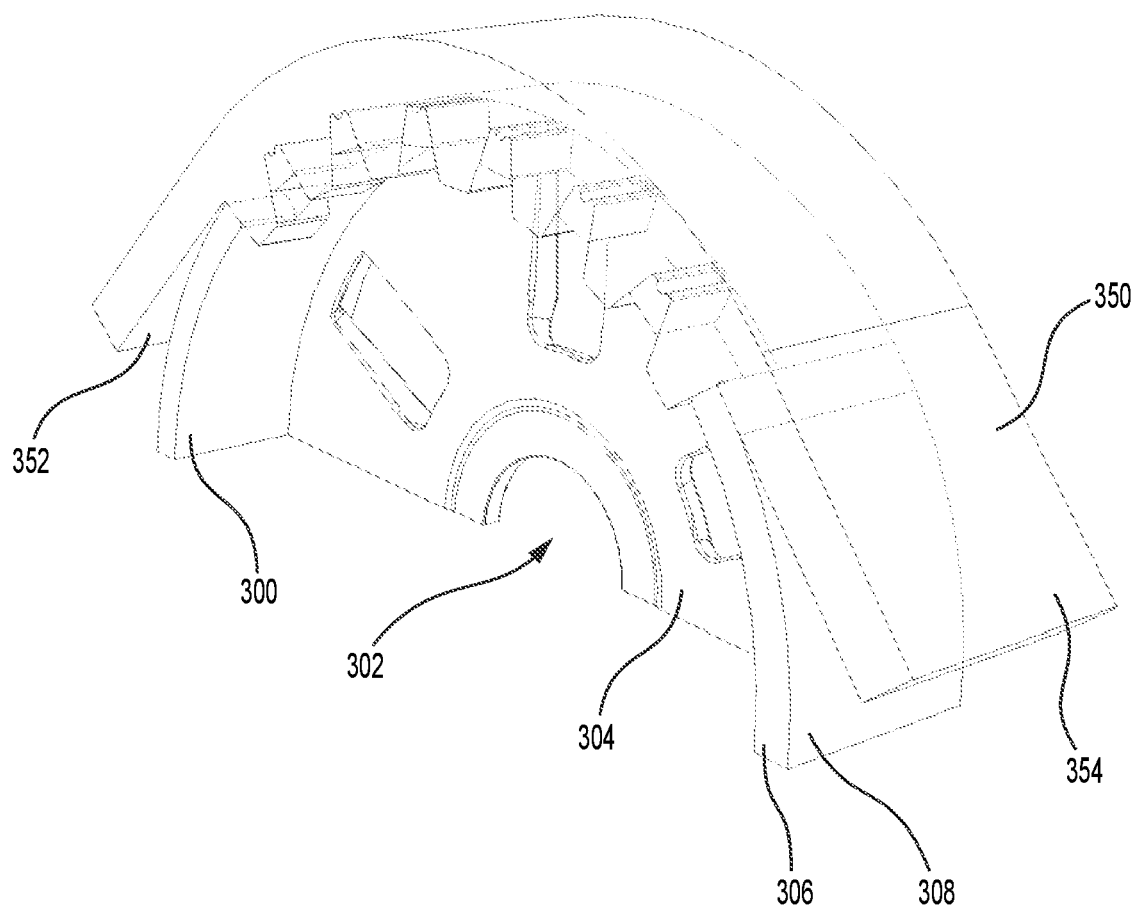
FIG. 8 is a perspective view taken from a top, rear, left side of a third embodiment of a portion of a drive wheel and a portion of an endless track of the track system of FIG. 1.
Figure 9:
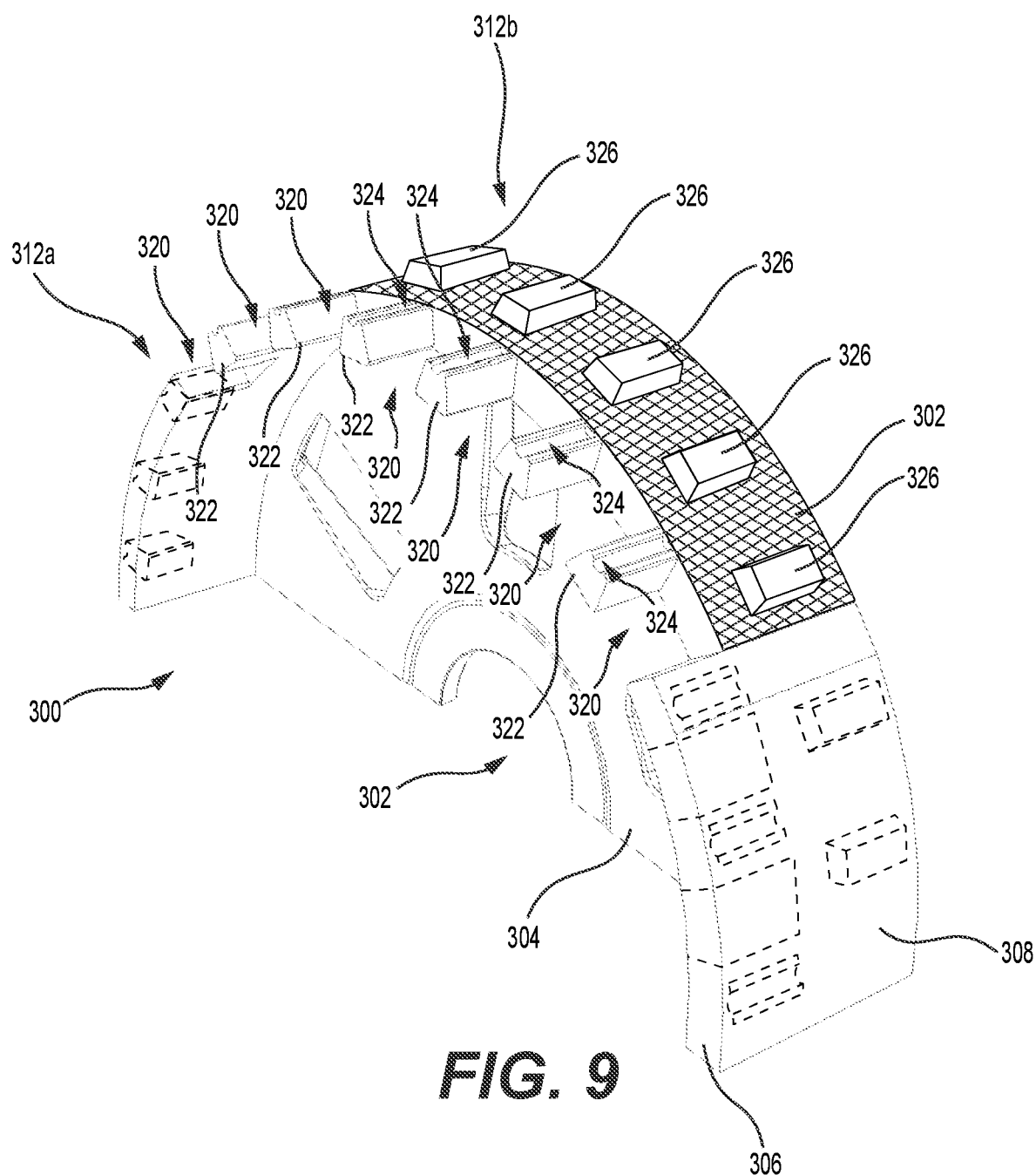
FIG. 9 is a perspective view taken from a top, rear, left side of the portion of the drive wheel of FIG. 8.
Figure 10:
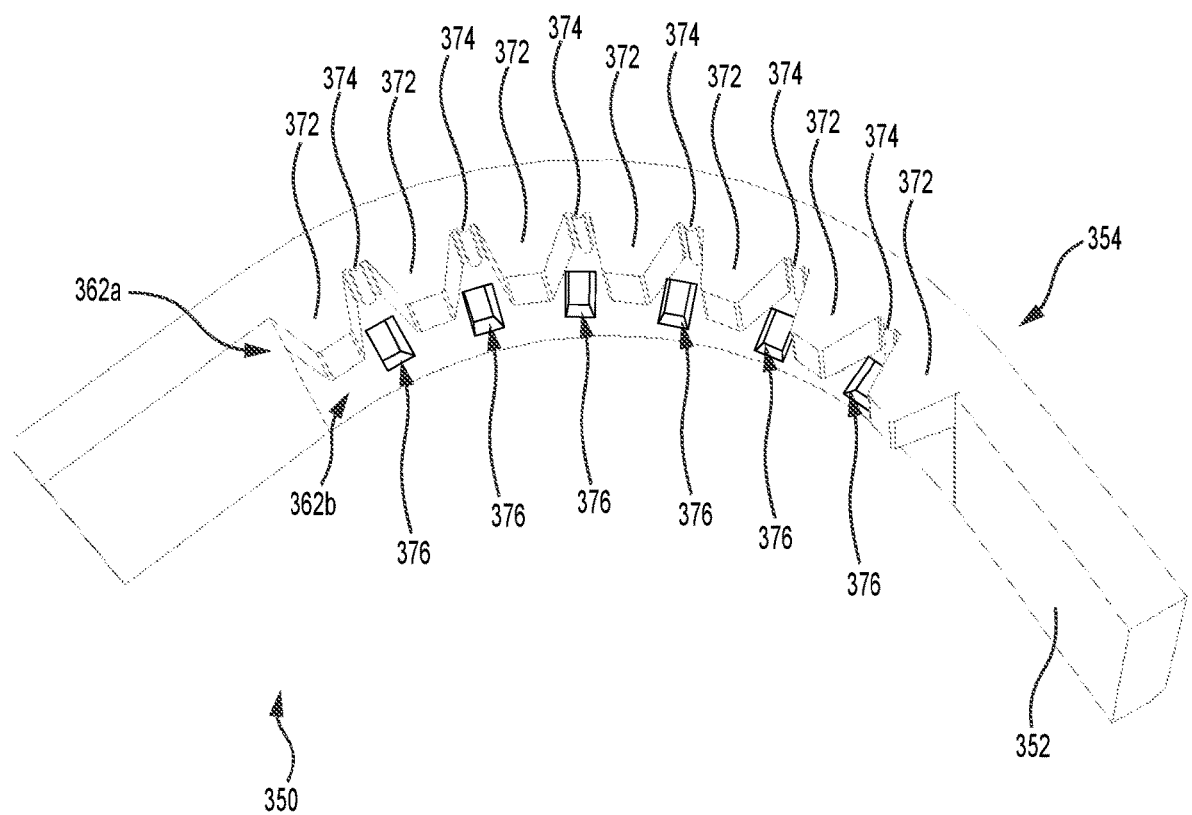
FIG. 10 is a perspective view taken from a bottom, rear, left side of the portion of the endless track of FIG. 8.

Referring to FIGS. 8 to 10, a portion of a third embodiment of the drive wheel 100, namely referenced as drive wheel 300, and the endless track 150, namely referenced as endless track 350, is shown. It is understood that though only a portion is shown, the features described below are present, where applicable, on the entire drive wheel 300 and/or on the entire endless track 350. The drive wheel 300 and the endless track 350 are configured to engage with one another.

The drive wheel 300 has a hub 302, a body 304 and a rim 306. The hub 302 is at a center of the drive wheel 300 and is operatively connectable to the driving axle. The body 304 extends radially from the hub 302. The rim 306 radially surrounds the body 304, and has an outer rim surface 308 that engages an inner surface 352 of the endless track 350. The rim 306 has a left lateral portion 312a and a right lateral portion 312b. It is contemplated that in some embodiments, the rim 306 could have a center portion and or crowned portions.

The drive wheel 300 has a plurality of apertures 320 radially defined at the left lateral portion 312a of the rim 306. The plurality of apertures 320 is separated by a plurality of first track engagers 322. The first track engagers 322 extend laterally, to the left, from the right lateral portion 312b. It is contemplated that in some embodiments, the apertures 320 and the first track engagers 322 could be on the right lateral side 312b, or at a center portion of the rim 306. The first track engagers 322 extend radially inwardly from the outer rim surface 308, though it is contemplated that the first track engagers 322 could extend radially outwardly from the outer rim surface 308.

The drive wheel 300 also has a plurality of second track engagers 324 also radially disposed on the rim 306, at the left lateral portion 312b. Each one of the second track engagers 324 is operationally aligned with one of the first track engagers 322, such that each one of the plurality of the second track engagers 324 is disposed on one of the first track engagers 322, and extends radially inwardly therefrom. In other words, the second track engagers 324 are recesses 324.

The drive wheel 300 further has a plurality of third track engagers 326 radially disposed on the rim 306, at the right lateral portion 312b. Thus, the third track engagers 326 are disposed on right lateral side of the first track engagers 322. The third track engagers 326 extend radially outwardly from the outer rim surface 308.

The drive wheel 300 also has knurled finish 302 defined on the outer rim surface 308. It is contemplated that in other embodiments, the drive wheel 300 could have other friction-enhancing finishes defined on the outer rim surface 308.

Referring now to FIG. 10, the endless track 350, which is configured to engage the drive wheel 300, has the inner surface 352 and an outer surface 354 opposite to the inner surface 352. The inner surface 352 has a left lateral portion 362a and a right lateral portion 362b. It is contemplated that in some embodiments, the inner surface 352 could have a center portion and/or crowned portions.

The endless track 350 has a plurality of first drive wheel engagers 372 disposed longitudinally along the left lateral side 362a of the inner surface 352. It is contemplated that in some embodiments, the first drive wheel engagers 372 could be on the right lateral side 362. In the present embodiment, the first drive wheel engagers 372 extend from the inner surface 352 opposite to the outer surface 354. As will be described in greater detail below, the first drive wheel engagers 372 are configured to be received in the apertures 320.

The endless track 350 also has a plurality of second drive wheel engagers 374 disposed longitudinally along the left lateral portion 362a of the inner surface 352. Each of the second drive wheel engagers 374 is operationally aligned with two of the first drive wheel engagers 372, such that each of the second drive wheel engagers 374 is longitudinally adjacent to two of the first drive wheel engagers 372. In the present embodiment, the second drive wheel engagers 374 extend from the inner surface 352 toward the outer surface 354, such that the second drive wheel engagers 374 extend from the inner surface 352 opposite to the outer surface 354 As will be described in greater detail below, the second drive wheel engagers 374 are configured to be received in the second track engagers 324.

The endless track 350 further has a plurality of outer drive wheel engagers 376 that is disposed longitudinally along the right lateral portion 362b of the inner surface 352. Thus, the third drive wheel engagers 376 are disposed on a right lateral side of the first drive wheel engagers 372. In the present embodiment, the third drive wheel engagers 376 extend from the inner surface 352 toward the outer surface 354, such that the third drive wheel engagers 376 are recesses 376. As will be described in greater detail below, the third drive wheel engagers 376 are configured to receive the third track engagers 326 therein.

The outer surface 354 has a tread defined thereon (shown in alternate embodiment at FIG. 5). It is contemplated that the tread could vary from one embodiment to another. In some embodiments, the tread could depend on the type of vehicle on which the track system 50 is to be used and/or the type of ground surface on which the vehicle is destined to travel.

The engagement between the drive wheel 300 and the endless track 350 resulting in force transfer will now be described in accordance to the present embodiment.

At any given time, a portion of the drive wheel 300 is engaging a portion of the endless track 350, as shown in FIG. 8. In some instances, some of the first drive wheel engagers 372 of the endless track 350 are received in some of the apertures 320 of the drive wheel 300 such that some of the first track engagers 322 of the drive wheel 300 engage with some of the first drive wheel engagers 372, some of the second track engagers 324 of the drive wheel 300 receive therein, and engage with, the second drive wheel engagers 374 of the endless track 300, and some of the third track engagers 326 of the drive wheel 300 are received in, and engage with, the third drive wheel engagers 376.

When the drive wheel 300 is rotated by the driving axle of the vehicle, the rotational force (torque) thereof is transmitted to the endless track 350. The engagement between the first track engagers 322 and the first drive wheel engagers 372 is typically how most of the rotational force of the drive wheel 300 is transferred to the endless track 350. As such, the first drive wheel engagers 372 are subject to significant stresses. The engagement between the second track engagers 324 and the second drive wheel engagers 374 assists in transferring a portion of the rotational force of the drive wheel 300 to the endless track 350, thereby reducing the magnitude of the stresses subjected to the first drive wheel engagers 372. In addition, the engagement between the second track engagers 324 and the second drive wheel engagers 374 enhances a grip between the drive wheel 300 and the endless track 350 by a significant amount, which reduces the likelihood for tooth skipping. The engagement between the third track engagers 326 and the third drive wheel engagers 376 also contributes to the transfer of a portion of the rotational force of drive wheel 300 to the endless track 350, thereby further reducing the magnitude of the stresses subjected to the first drive wheel engagers 372. The knurled finish 302 of the drive wheel 300 engages with the inner side 352, and through enhanced fiction helps in transferring a portion of the rotational force of drive wheel 300 to the endless track.

The combination of the first track engagers 322, the second track engagers 324 and the third track engagers 326 in the drive wheel 300, and the combination of the first drive wheel engagers 372, the second track engagers 374 and the third track engagers 376 in the endless track 350, in addition to reducing stresses within the drive wheel 300 and the endless track 350 and enhancing the grip between the drive wheel 300 and the endless track 350, also aid in reducing accumulation of matter within the drive wheel 300 and the endless track 350. For instance, the presence of the second drive wheel engagers 374 can prevent the accumulation of matter between the first engagers 372. The combination of the first track engagers 322, the second track engagers 324 and the third track engagers 326 in the drive wheel 300, and the combination of the first drive wheel engagers 372, the second track engagers 374 and the third track engagers 376 in the endless track 350 can also permit for a lighter endless track 350, and thus can also provide an economical advantage.

Materials and Manufacturing

The various components of the support structure 100 and the track system 50 are made of conventional materials (e.g. metals and metal alloys in most cases, such as steel) via conventional manufacturing processes (e.g. casting, molding, etc.). The present technology does not require any specific materials nor methods of manufacture. The present technology merely requires that each component be suitable for the purpose for which it is intended and the use to which it is to be put. Any material(s) or method(s) of manufacture which produce such components may be used in the present technology.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

The invention claimed is:

1. A drive wheel for a track system having an endless track with an inner surface, the inner surface having a plurality of first drive wheel engagers, a plurality of second drive wheel engagers, and a plurality of third drive wheel engagers, the drive wheel being engageable with the endless track and comprising:
   a hub operatively connectable to a driving axle of a vehicle;
   a body extending radially from the hub; and
   a rim radially surrounding to the body, the rim having an outer rim surface engageable to the inner track surface;
   a plurality of first track engagers radially disposed on the rim and configured for being driveably engageable with the plurality of first drive wheel engagers of the endless track, the plurality of first track engagers extending radially inwardly from the outer rim surface;
   a plurality of second track engagers radially disposed on the rim, each one of the plurality of second track engagers being operationally aligned with one of the plurality of first track engagers and configured for being driveably engageable with the plurality of second drive wheel engagers of the endless track; and
   a plurality of third track engagers radially disposed on the rim, on at least one lateral side of the plurality of first track engagers, the plurality of third track engagers being configured for being driveably engageable with the plurality of third drive wheel engagers of the endless track, the plurality of third track engagers extending from the outer rim surface, in either a radially outward direction or in a radially inward direction.

2. The drive wheel of claim 1, wherein the rim has a center portion, a first lateral portion and a second lateral portion, the first and second lateral portions being disposed on either side of the center portion, and the plurality of first and second track engagers are radially disposed at the center portion, and the plurality of third track engagers are disposed at the first and second lateral portions.

3. The drive wheel of claim 1, wherein the rim includes:
   at least one crowned portion extending axially outwardly from the rim, and
   a plurality of fourth track engagers disposed on the at least one crowned portion, the plurality of fourth track engagers being engageable with a plurality of fourth drive wheel engagers of the endless track.

4. The drive wheel of claim 1, wherein the drive wheel further has a friction-enhancing finish on the outer rim surface configured for being driveably engageable with the inner surface of the endless track.

5. The drive wheel of claim 4, wherein the friction-enhancing finish is a knurled finish.

6. The drive wheel of claim 1, wherein the each one of the plurality of second track engagers is operationally aligned with the one of the plurality of first track engagers by being defined in the one of the plurality of the first track engagers, and the each one of the plurality of second track engagers extends radially inwardly from the outer rim surface.

7. The drive wheel of claim 1, wherein the each one of the plurality of second track engagers is operationally aligned with the one of the plurality of first track engagers by being disposed on the one of the plurality of the first track engagers, and the each one of the plurality of second track engagers extends radially outwardly.

8. The drive wheel of claim 1, wherein the operational alignment of the plurality of second track engagers with the plurality of first track engagers enhances a grip between the drive wheel and the endless track.

9. The drive wheel of claim 1, wherein the operational alignment of the plurality of second track engagers with the plurality of first track engagers reduces stress induced in the endless track.

10. An endless track for a track system having a drive wheel with a plurality of first track engagers, a plurality of second track engagers and a plurality of third track engagers, the endless track being engageable with the drive wheel of the track system and comprising:
    an inner surface,
    an outer surface opposite to the inner surface,
    a plurality of first drive wheel engagers disposed longitudinally along the inner surface, and being engageable with the plurality of first track engagers of the drive wheel, the plurality of first drive wheel engagers extending radially outwardly from the inner surface toward the outer surface;
    a plurality of second drive wheel engagers disposed longitudinally along the inner surface, each one of the plurality of second drive wheel engagers being operationally aligned with at least one of the plurality first drive wheel engagers, and being engageable with the plurality of second track engagers of the drive wheel; and
    a plurality of third drive wheel engagers disposed longitudinally along the inner surface, on at least one lateral side of the plurality of first drive wheel engagers, and being engageable with the plurality of third track engagers of the drive wheel, the plurality of third drive wheel engagers extending from the inner surface, in either a radially inward direction or in a radially outward direction.

11. The endless track of claim 10, wherein the inner surface has a center portion, a first lateral portion and a second lateral portion, the first and second lateral portions being disposed on either side of the center portion, and the plurality of first and second drive wheel engagers are disposed on the center portion and the plurality of third drive wheel engagers are disposed at the first and second lateral portions.

12. The endless track of claim 10, wherein the endless track includes:
   a first lateral edge and a second lateral edge, and
   a plurality of fourth drive wheel engagers disposed on at least one of the first and second lateral edges, the plurality of fourth drive wheel engagers being engageable with a plurality of fourth drive wheel engagers of the drive wheel.

13. The endless track of claim 10, wherein each one of the plurality of second drive wheel engagers is operationally aligned with the at least one of the plurality of first drive wheel engagers by being defined in the inner surface of the endless track, adjacent to the at least one of the plurality of first drive wheel engagers, and extending from the inner surface toward the outer surface.

14. The endless track of claim 10, wherein each one of the plurality of second drive wheel engagers is operationally aligned with the at least one of the plurality of first drive wheel engagers by being defined in the inner surface of the endless track, adjacent to the at least one of the plurality of first drive wheel engagers, and extending from the inner surface, towards a direction that is opposite to the outer surface.

15. The endless track of claim 10, wherein the operational alignment of the plurality of second drive wheel engagers with the plurality of first drive wheel engagers enhances a grip between the drive wheel and the endless track.

16. The endless track of claim 10, wherein the operational alignment of the plurality of second drive wheel engagers with the plurality of first drive wheel engagers reduces stress induced in the endless track.

17. A track system for a vehicle comprising:
   a frame assembly;
   a drive wheel connected to the frame assembly and having:
      a hub operatively connectable to a driving axle of a vehicle;
      a body extending radially from the hub; and
      a rim connected to the body, the rim having an outer rim surface engageable to the inner track surface;
      a plurality of first track engagers radially disposed on the rim, the plurality of first track engagers extending radially inwardly from the outer rim surface;
      a plurality of second track engagers radially disposed on the rim, each one of the plurality of second track engagers being operationally aligned with one of the plurality of first track engagers; and
      a plurality of third track engagers radially disposed on the rim, on at least one lateral side of the plurality of first track engagers, the plurality of third track engagers extending from the outer rim surface, in either a radially outward direction or in a radially inward direction,
   at least one support wheel assembly connected to the frame assembly;
   at least one idler wheel assembly connected to the frame assembly; and
   an endless track surrounding the drive wheel, the at least one support wheel assembly and the at least one idler wheel assembly, the endless track having:
      an outer surface,
      an inner surface opposite to the outer surface, the inner surface having:
         a plurality of first drive wheel engagers disposed longitudinally, the plurality of first drive wheel engagers extending radially outwardly from the inner surface;
         a plurality of second drive wheel engagers disposed longitudinally, each one of the plurality of second drive wheel engagers being operationally aligned with at least one of the plurality first drive wheel engagers; and
         a plurality of third drive wheel engagers disposed longitudinally on at least one lateral side of the plurality of first drive wheel engagers, the plurality of third drive wheel engagers extending from the inner surface, in either a radially inward direction or in a radially outward direction,
   the plurality of first track engagers engaging the plurality of first drive wheel engagers, the plurality of second track engagers engaging the plurality of second drive wheel engagers, the plurality of third track engagers engaging the plurality of the third drive wheel engagers.

* * * * *